United States Patent [19]

Hadley et al.

[11] Patent Number: 5,243,640
[45] Date of Patent: Sep. 7, 1993

[54] INTEGRATED CELLULAR TELEPHONE AND VEHICULAR AUDIO SYSTEM

[75] Inventors: Darby E. Hadley, Dearborn; Nicholas L. DiFiore, Farmington Hills; Jeffrey N. Golden, Southfield, all of Mich.

[73] Assignee: Ford Motor Company, Dearborn, Mich.

[21] Appl. No.: 756,254

[22] Filed: Sep. 6, 1991

[51] Int. Cl.⁵ ............... H04M 11/00; H04M 1/00; H04B 3/00; H04B 3/00
[52] U.S. Cl. ........................... 379/59; 379/58; 379/421; 381/80; 381/81; 381/86; 381/123
[58] Field of Search ............... 379/58, 59, 421, 441; 455/88; 381/80, 81, 86, 123

[56] References Cited

U.S. PATENT DOCUMENTS

| | | | |
|---|---|---|---|
| 1,909,843 | 5/1933 | Squire . | |
| 3,868,571 | 2/1975 | Greiner | 325/15 |
| 3,971,985 | 7/1976 | Arai | 325/21 |
| 4,027,249 | 5/1977 | Calman | 325/312 |
| 4,060,766 | 11/1977 | Kazuo | 455/88 |
| 4,105,974 | 8/1978 | Rogers | 455/88 |
| 4,389,543 | 6/1983 | Granirer et al. | 179/2 B |
| 4,435,845 | 3/1984 | Timm et al. | 381/123 |
| 4,524,461 | 6/1985 | Kostanty et al. | 455/79 |
| 4,591,661 | 5/1986 | Benedetto et al. | 379/61 |
| 4,860,337 | 8/1989 | Shimura | 379/58 |
| 4,873,712 | 10/1989 | Porco | 379/58 |
| 4,903,324 | 2/1990 | Warnagiris | 455/88 |
| 4,993,061 | 2/1991 | Hsieh | 379/58 |

Primary Examiner—Curtis Kuntz
Assistant Examiner—Vijay Shankar
Attorney, Agent, or Firm—Mark Mollon; Roger L. May

[57] ABSTRACT

An output transducer and amplifier are shared between an audio system and a cellular Phone in an automotive vehicle. An interface arbitrates between the program audio signals and the phone audio signals to select or deselect each of the audio signals depending on the status of each audio source. When only one source is in use then normally the audio signals from that source are selected. If both sources are turned on but a phone call is not in progress, then audio signals from both sources are simultaneously presented to the output transducers after summing. When a call is in progress, only the phone audio signals are selected.

14 Claims, 3 Drawing Sheets

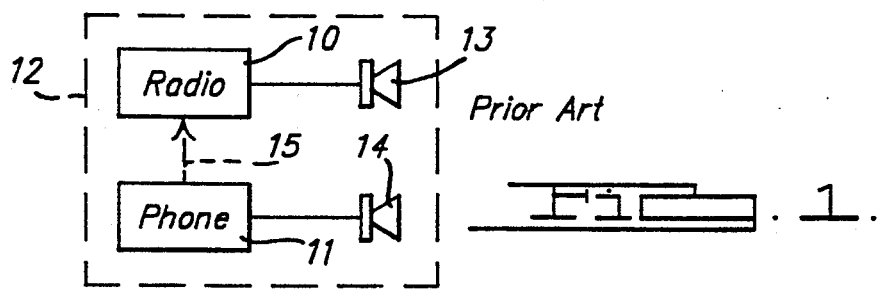
Prior Art
FIG. 1.
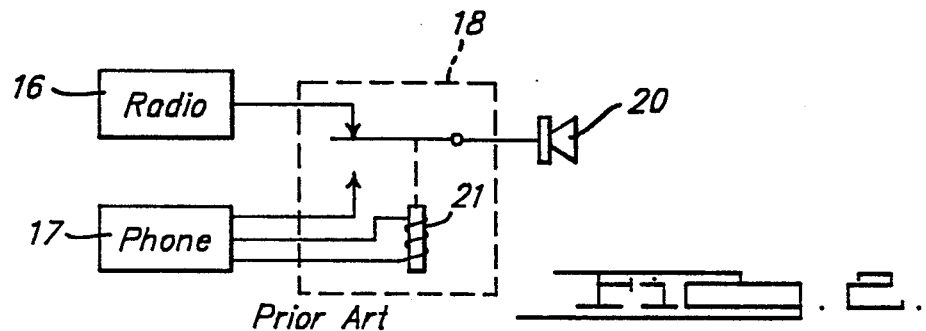
Prior Art
FIG. 2.
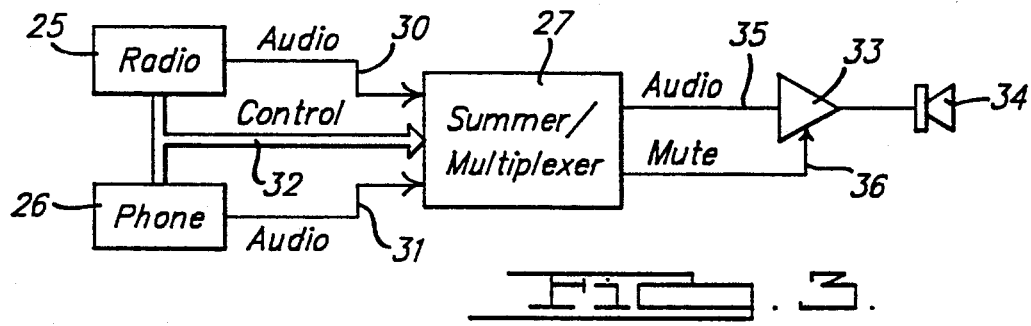
FIG. 3.
|  | Radio Off | Radio On |
|---|---|---|
| Phone Off | Deselect Both Radio And Phone | Select Radio Signals Only |
| Phone On | Select Phone Signals Only | If No Call Is In Progress, Then Sum Radio And Phone Signals |
|  |  | If Call Is In Progress, Select Phone Signals Only |
FIG. 4.

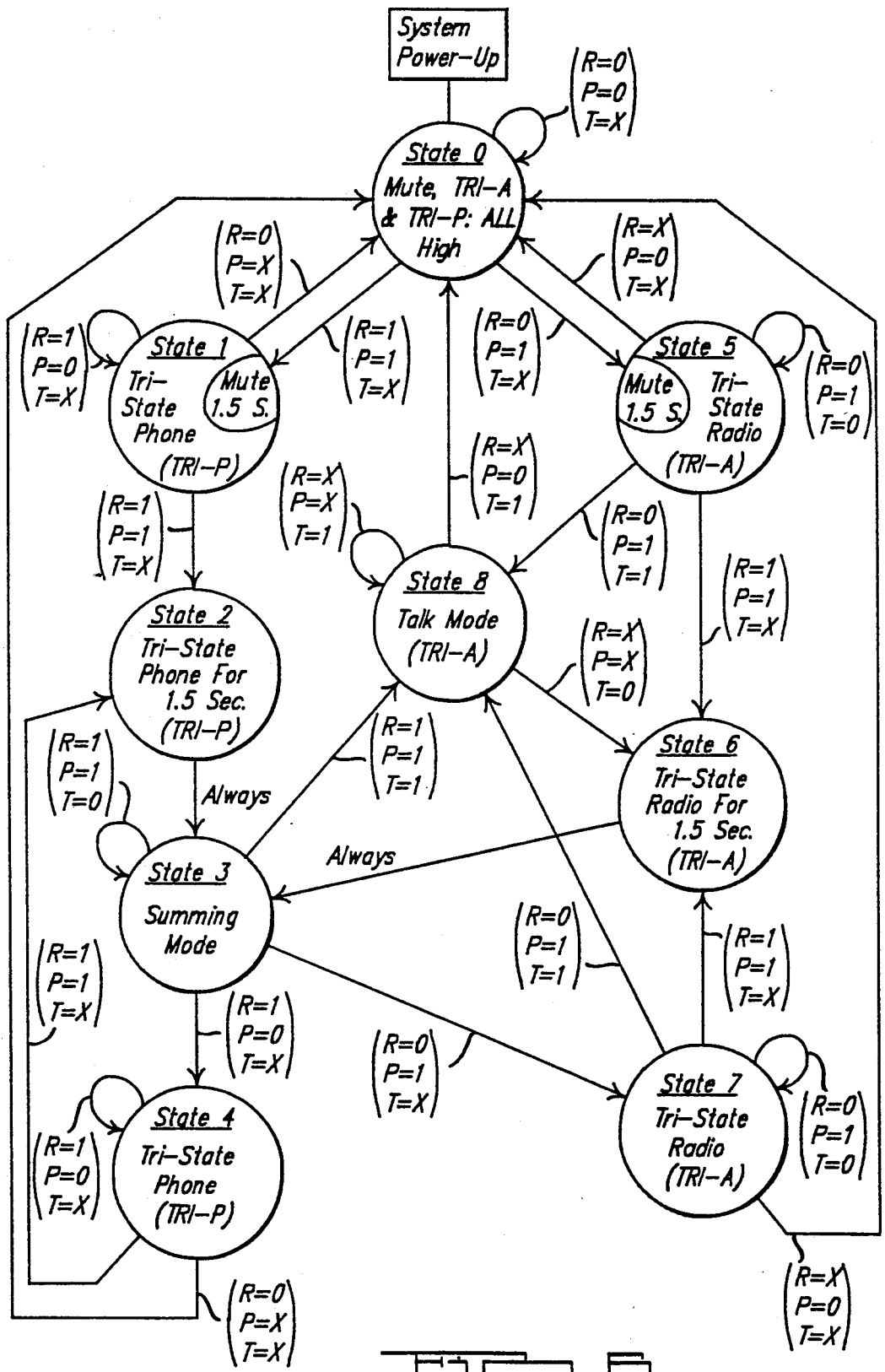

INTEGRATED CELLULAR TELEPHONE AND VEHICULAR AUDIO SYSTEM

BACKGROUND OF THE INVENTION

The present invention relates in general to interfacing a shared output transducer to an audio program source and a telephone, and more specifically to coordinating operation of an audio system and a cellular phone in a vehicle.

Increasing numbers of automotive vehicles are being equipped with mobile communication devices, such as cellular telephones. Nearly every vehicle is equipped with an audio system; such as, a radio, a cassette tape, a CD player, and combinations thereof. Consequently, the operation of each system take into account the presence of the other system. For example, it is desirable for the audio system to inhibit its production of sound during times when a call is in progress on the cellular phone. However, an unexpected and abrupt cutting off of the audio system upon the receipt of an incoming call is undesirable, especially if the audio output was being played at a loud volume.

In order to improve the convenience of using a mobile communications system, a transceiver is preferably provided having hands-free operation wherein the user of the system is not required to hold a handset. Instead, a microphone is located near the user in order to pick up voice signals, and a loudspeaker mounted in the vehicle is employed to project audible signals to be heard by the user.

It would be desirable to integrate the two systems together in order to share components and to thereby eliminate duplication and reduce costs and complexity of the overall system. Thus, automotive vehicles are known that contain a cellular phone and an audio system that share a common speaker. Input to the shared speaker has been controlled by a switching relay. However, relays cause abrupt cut-offs in the audio program material Furthermore, undesirable noises (e.g., "pops") are created by switching of the relay and by turning on and off of the audio system and the cellular phone.

Theses are some of the disadvantages of the prior art that the present invention overcomes.

SUMMARY OF THE INVENTION

It is a principal object of the present invention to share an output transducer between an audio system and a phone.

It is another object of the present invention to provide an interface between an audio system and a telephone that avoids abruptly cutting off the audio output in response to the reception of a call by the telephone.

It is another object of the present invention to provide method and apparatus to selectively couple program audio signals and phone audio signals to an output transducer depending on the activation of a main program audio system and a telephone.

It is a further object of the invention to provide an integrated audio system and cellular phone for use in an automotive vehicle that is convenient to use.

These and other objects are achieved by employing a summer/multiplexer receiving audio signals from a program audio source and a telephone wherein the summer/multiplexer couples either only the program audio signals, only the phone audio signals, or a summation of both signals to a shared output transducer depending on control signals received from the program audio source and the telephone. The summer/multiplexer selects both the program audio signal and the phone audio signals simultaneously when the program audio source and the telephone are both in use and a call is not in progress. Only the phone audio signals are selected when a call is in progress. As used herein, the term "telephone" includes mobile communication transceivers, such as a cellular telephone. The term "program audio source" includes a radio or a play-back unit for recorded media.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

FIG. 1 is a block diagram showing a first prior art system.

FIG. 2 is a block diagram showing a second prior art system.

FIG. 3 is a block diagram showing an improved integrated radio and telephone according to the present invention.

FIG. 4 is a decision matrix illustrating the operation of the present invention.

FIG. 6 is a state diagram which is preferably implemented in the state machine control logic shown in FIG. 5.

DETAILED DESCRIPTION OF PREFERRED EMBODIMENTS

Figure 5:
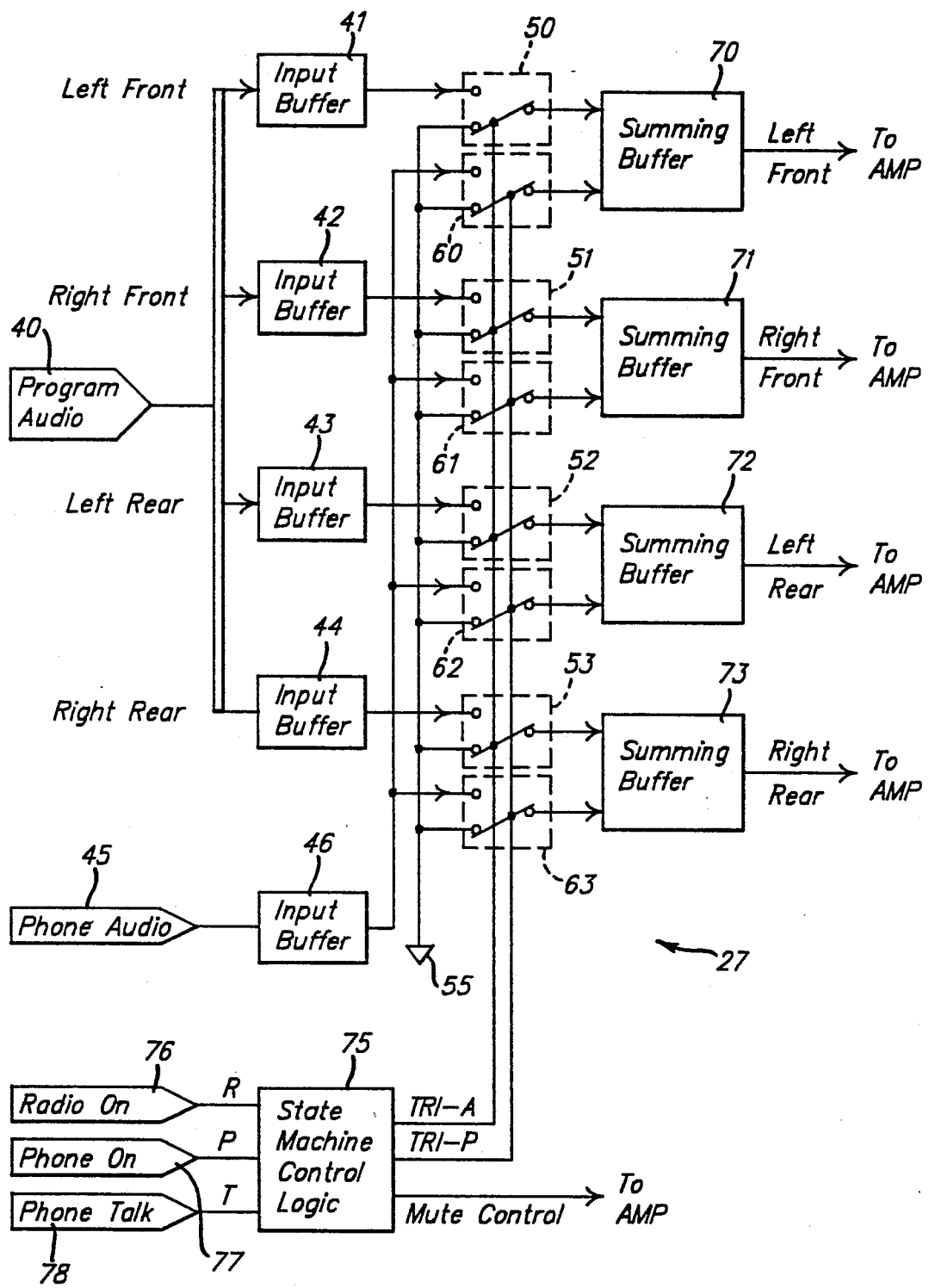
FIG. 5 is a schematic, block diagram showing one embodiment of the present invention.

FIG. 1 shows a radio 10 and a telephone 11 contained in an area 12, such as the interior of an automobile. Radio 10 has its own dedicated output transducer (e.g., speaker) 13 and telephone 11 has its own dedicatd speaker 14 Thus, radio 10 and phone 11 are each complete systems and they can operate independently. In some prior art devices, a signal 15 has been provided from phone 11 to radio 10 in order to mute radio 10 so that no radio output is produced to interfere with use of phone 11 Thus, phone audio signals from phone 11 always dominate over any signals from radio 10.

FIG. 2 shows a further prior art configuration wherein a radio 16 and a phone 17 have their outputs connected to inputs of a relay 18. The output of relay 18 is connected to a speaker 20. Radio 16 has its output connected to the normally closed input of relay 18 and phone 17 has its audio output connected to the normally open input of relay 18. Phone 17 further has an output connected to a relay control winding 21 for causing relay 18 to switch over to phone audio signals whenever phone 17 is in use. However, the systems of FIGS. 1 and 2 are subject to the disadvantages mentioned above.

FIG. 3 shows a preferred embodiment of the present invention including a radio 25 and a phone 26 interconnected with a summer/multiplexer 27. Audio signals from radio 25 and phone 26 are selected by summer/multiplexer 27 and provided to an amplifier 33 and a speaker 34 in dependence on control signals provided by radio 25 and phone 26. Radio 25 is a program audio source and may include a radio receiver, cassette player, a CD player, or a combination of these. Program audio signals are provided over a line 30 to one input of summer/multiplexer 27. Phone 26 is any telephone device such as a mobile communication transceiver and provides phone audio signals on a line 31 to another input of summer/multiplexer 27. Control signals are provided from radio 25 and phone 26 over a control bus 32 to additional inputs of summer/multiplexer 27.

Audio signals as selected from radio 25 and phone 26 by summer/multiplexer 27 are provided over a line 35 to the input of amplifier 33. Summer/multiplexer 27 provides an additional mute control signal to amplifier 33 on a line 36. Amplifier 33 is preferably muted during the turning on of radio 25 or phone 26 to avoid noises being produced over speaker 34.

The control signals on control bus 32 preferably include a signal from radio 25 indicating whether radio 25 is active or in use (i.e., turned on), a signal indicating whether phone 26 is turned on, and a signal from phone 26 indicating whether a call is in progress (i.e., a outgoing call has been dialed and entered or an incoming call has been answered).

The selection of signals by summer/multiplexer 27 will be described with reference to FIG. 4. When the control signals indicate that the radio is off and the phone is off, then summer/multiplexer deselects (i.e., does not transmit) the radio and phone signals. In addition, a mute signal may be provided from the summer/multiplexer to the amplifier in order to prevent any spurious signals from being provided to the output speaker.

When the control signals indicate that the radio is on (i.e., in use) and the phone is off, the summer/multiplexer selects only radio signals for connection with the amplifier input. Preferably, the amplifier continues to be muted for a brief period after turning on of the radio to avoid "pops". A typical delay of about 1.5 seconds is desirable.

If the control signals indicate that the radio is off and the phone is on, then the summer/multiplexer selects phone signals only. The amplifier may preferably be continued to be muted during the first 1.5 seconds after the phone is turned on.

When the control signals indicate that both the radio and phone are turned on, then the action of the summer/multiplexer depends on the third control signal which indicates whether a call is currently in progress. If no call is in progress, then the audio signals from the radio and phone are summed and the summed signal is provided to the amplifier and speaker. Whenever a call is in progress, phone signals only are selected so that the radio audio signals do not interfere with the phone conversation.

By virtue of this invention, audible tones generated by the phone (e.g., touch tones for providing feedback when phone control buttons are pushed and ringing signals when an incoming call is received) are added to the radio program audio so that the radio program audio is not interrupted while a call is not in progress. Furthermore, it is more natural and pleasing to the vehicle occupants to have the radio program audio continue to play while the phone is ringing to announce an incoming call.

Summer/multiplexer 27 is shown in greater detail in FIG. 5. Program audio signals are shown including front and rear stereo signals (left front, right front, left rear, and right rear) at an input 40 are provided to input buffers 41, 42, 43, and 44, respectively. Phone audio signals are received at an input 45 and are provided to an input buffer 46.

Input buffers 41–44 receiving the radio program audio signals are connected to a first group of single-pole, double-throw switches 50–53 with two selectable inputs and one fixed output. Thus, the output of input buffer 41 is connected to one input of a switch 50. The second input of switch 50 is connected to ground at a grounding point 55. The output of switch 50 is connected to one input of a summing buffer 70. A control input of switch 50 is connected to a control signal TRI-A from a state machine control logic block 75.

Switches 51–53 of the first group of switches are connected to respective input buffers 42–44, summing buffers 71–73, and state machine control logic block 75 in the same manner as switch 50.

Input buffer 46 receiving phone audio signals has its output connected to a second group of single-pole, double-throw switches 60–63 with two selectable input terminals and a fixed output terminal. Each switch 60–63 has a first input connected to the output of input buffer 46 and a second input connected to ground 55. The output terminals of switches 60–63 are respectively connected to a second input of a respective summing buffer 70–73. The control input of each switch 60–63 is connected to receive a control signal TRI-P from state machine logic block 75. The outputs of summing buffers 70–73 provide left front, right front, left rear, and right rear output signals to the output power amplifier which in this preferred embodiment comprises a multi-channel amplifier (not shown).

The configuration shown in FIG. 5 results in both the program audio signals and the phone audio signals being reproduced through all four speakers of a typical automotive audio system. However, the phone audio signals could be reproduced through less than all of the speakers by reducing the number of interconnections between input buffer 46 and the second group of switches.

State machine control logic block 75 receives a radio ON control signal R at an input 76, a phone ON control signal P at an input 77, and a phone TALK control signal T at an input 78. Based on the level of the control signals R, P and T, state machine control logic block 75 controls the switching of the first group of switches by virtue of a control signal TRI-A and the second group of switches by virtue of control signal TRI-P. Thus, when control signal TRI-A has a high logic level, switches 50–53 assume the configuration shown in FIG. 5 wherein the program audio signals from input buffers 41–44 are in a tri-state (i.e., unconnected) condition and the first inputs of summing buffers 70–73 are connected to ground 55. Thus, when control signal TRI-A is high, the program audio signals are deselected; and when control signal TRI-A is low, the program audio signals are selected for reproduction by the power amplifier and speakers Similarly, a control signal TRI-P from state machine control logic block 75 controls the second group of switches 60–63 to deselect the phone audio signals when control signal TRI-P is high and to select the phone audio signals when control signal TRI-P is low. State machine control logic block 75 further provides a mute control signal to the amplifier in order to disable the output of the amplifier whenever the radio or telephone are first being turned on.

State machine control logic block 75 responds to control signals R, P and T such that when both the radio and telephone are off, neither source of audio signals is selected and the amplifier is muted so that no noise is heard from the speakers. If the radio is first turned on, then the program audio signals only are selected while the mute control signal continues to cause the amplifier to mute its output for a short delay (e.g., 1.5 seconds) to prevent any transients (e.g., pops) created during the powering up of the radio from reaching the amplifier output. Likewise, if the telephone is first turned on, then the phone audio signals are selected and the amplifier output is muted for a short delay. When both the radio and phone are turned on, both sources of audio signals will be selected and the sum of the signals sent to the amplifier. However, the tri-stating control signal TRI-A or TRI-P of the second source to be turned on will remain at a high level for a short delay after turning on to prevent transients or pops from passing through the summing buffers. Thereafter, the system user can listen to the program audio and can operate a telephone key pad while hearing the key pad tones through the speakers simultaneously. In the case of an incoming call, the ringing tones are heard through the speakers simultaneously with the program audio signals.

When a call is in progress and the control signal P is at a high level, only the phone audio signals are selected. For purposes of the present invention, a call is in progress when a two-way mobile communication link is established. For example, in a cellular phone, a call is in progress whenever the "SEND" button on the cellular phone is pressed to either answer an incoming call or to place an outgoing call after having entered an outgoing telephone number. The call in progress ends when the "END" button on the cellular phone is pressed, the power is turned off to the phone, or a time-out period expires after the party at the other end of a call hangs up.

The operation of the state machine control logic block will be described in greater detail with reference to the state diagram in FIG. 6. After power-up of the interface system, the control logic block enters a State 0 wherein the mute control signal, TRI-A, and TRI-P are all high. The control logic block remains in State 0 as long as control signals R and P are low (i.e., zero).

Transitions from one state to another are determined when the values of control signals R, P, and T change as shown in the brackets in FIG. 6. The letter "X" indicates that the value of a particular control signal (e.g., control signal T with regard to the self-loop in State 0) does not affect a particular transition.

When control signal R changes to a high level while in State 0 (i.e., R=1), then a transition is made to State 1. In State 1, the mute control signal remains at a high level for 1.5 seconds and then transitions to a low level. Also in State 1, control signal TRI-P is at a high level so that the phone audio signals are in a tri-state condition and the radio audio signals are selected. If the control signal P transitions to a high level (i.e., a binary one) while in State 0, then a transition is made to State 5 wherein the mute control signal is maintained at a high level for 1.5 seconds and the radio is placed in a tri-state condition by producing control signal TRI-A at a high level.

Returning to State 1, a self-loop maintains the control logic block in State 1 as long as R=1 and P=0. When the radio is turned off and R returns to zero, a transition is made back to State 0. If the phone is turned on when in State 1 (i.e., P=1), a transition is made to State 2.

In State 2, control signal TRI-P is maintained at a high level in order to maintain the phone audio signals at a tri-state condition for a short delay, preferably about 1.5 seconds. After the short delay, a transition is always made from State 2 directly to State 3.

State 3 implements the summing mode wherein the mute control signal, TRI-A, and TRI-P are all low (i.e., equal to zero) so that both the program audio signals and the phone audio signals are selected and the amplifier is unmuted A self-loop maintains the control logic block in State 3 while R=1, P=1 and T=0. If control signal P changes to zero, then a transition is made to State 4. If control signal R changes to zero, then a transition is made to State 7. If control signal T changes to a 1, then a transition is made to state 8.

In state 4, control signal TRI-P is generated at a high level in order to TRI-state the phone audio signals. State 4 includes a self-loop as long as R=1 and P=0. If control signal P changes back to a high level, then a transition is made back to State 2. If control signal R changes to a low logic level, then a transition is made to State 0.

Returning to State 5, a self-loop is executed in State 5 while R=0, P=1 and T=0. If control signal R changes to a high level, then a transition is made to State 6. If control signal T changes to a high level, then a transition is made to State 8. Finally, if control signal P changes to a low level, then a return is made to State 0.

In State 6, control signal TRI-A is maintained at a high level for a short delay, for example, 1.5 seconds. After the short delay, a transition is always made directly to State 3.

In State 7, control signal TRI-A is high (TRI-P and mute are low). A self-loop keeps the control logic block in State 7 while R=0, P=1 and T=0. If control signal P changes to a 0, then a transition is made to state 0. If control signal R changes to a 1, then a transition is made to State 6. If control signal T changes to a high level, then a transition is made to State 8.

State 8 comprises the talk mode of the summer/multiplexer wherein only the phone audio signals are selected and the control signal TRI-A is high in order to deselect the program audio signals. The control logic block stays in State 8 while P=1 and T=1. At the end of a conversation and when control signal T changes to 0, a transition is made to State 6. If the phone is turned off during a conversation (i.e., P=0 and T=1), then a transition is made from State 8 to state 0.

By virtue of the various states shown in FIG. 6, the interface system for sharing an output transducer between a program audio source and a telephone will function as a normal audio amplifier for the audio system until a control signal from the phone indicates that the phone is on, at which point the interface assumes a summing mode. During summing, the tones from the phone are added to the program audio so that the program material is not interrupted. When the control signals from the phone indicate that the user is finished dialing a number and wants to talk or the user has answered an incoming call, the interface deselects the program audio signals and plays only the phone audio signals through the speakers. If the radio is turned on while a call is in progress, the phone audio signals continue to be the only selected signals so that the phone call is uninterrupted. When the phone call is no longer in progress then program audio signals will be selected.

While preferred embodiments of the invention have been shown and described herein, it will be understood that such embodiments are provided by way of example only. Numerous variations, changes, and substitutions will occur to those skilled in the art without departing from the spirit of the invention.

Accordingly, it is intended that the appended claims cover all such variations as fall within the spirit and scope of the invention.

What is claimed is:

1. Apparatus for interfacing a shared output transducer with a program audio source and a telephone comprising:
   input means for receiving program audio signals from said program audio source and phone audio signals from said telephone;
   output means coupled to said input means for selectably coupling said program audio signals or said phone audio signals to said shared output transducer or for selectably coupling simultaneously both said program audio signals and said phone audio signals to said shared output transducer; and
   control means coupled to said input means and said output means for selecting said program audio signals and said phone audio signals simultaneously when said program audio source and said telephone are both in use and a call is not in progress and for selecting only said phone audio signals when a call is in progress.

2. The apparatus of claim 1 wherein said control means further selects only said phone audio signals when only said telephone is in use.

3. The apparatus of claim 1 wherein said control means further selects only said program audio signals when only said program audio source is in use.

4. The apparatus of claim 1 wherein said phone audio signals occurring when a call is not in progress include tones announcing an incoming call.

5. The apparatus of claim 1 wherein said telephone includes control keys for controlling operation thereof and wherein phone audio signals occurring when a call is not in progress include tones corresponding to the depression of said control keys.

6. Apparatus for interfacing a shared output transducer with a program audio source and a telephone comprising:
   summing means having a plurality of inputs and a summed output for coupling to said shared output transducer;
   first switch means for receiving program audio signals from said program audio source and for controllably coupling said program audio signals to one of said inputs of said summing means;
   second switch means for receiving phone audio signals from said telephone and for controllably coupling said phone audio signals to another one of said inputs of said summing means; and
   control means coupled to said first switch means and said second switch means for setting said first and second switch means to couple said program audio signals and said phone audio signals simultaneously to said summing means when said program audio source and said telephone are both in use and a call is not in progress and for setting said first and second switch means to couple only said phone audio signals to said summing means when a call is in progress.

7. The apparatus of claim 6 wherein said control means includes control inputs for coupling to said program audio source and said telephone to receive control signals indicating whether said program audio source and said telephone are in use and whether a call is in progress.

8. The apparatus of claim 6 further comprising muting means coupled to said summing means for muting said summed output while neither of said program audio suorce and said telephone is in use and then for a predetermined period of time after one of said program audio source or said telephone is first put into use.

9. An entertainment and communication system comprising:
   a program audio source providing program audio signals and a first control signal when said program audio source is in use;
   a telephone providing phone audio signals and a second control signal when said telephone is in use and providing a third control signal when a call is in progress;
   a shared transducer for converting said program audio signals and said phone audio signals into sound; and
   interface means coupled to said program audio source, said telephone, and said shared transducer for summing said program audio signals and said phone audio signals when said first and second controls signals indicate that said program audio source and said telephone are in use and said third control signal indicates that a call is not in progress.

10. The system of claim 9 wherein said telephone is a cellular telephone.

11. The system of claim 9 wherein said phone audio signals occurring when a call is not in progress include tones announcing an incoming call.

12. The system of claim 9 wherein said telephone includes control keys for controlling operation thereof and wherein phone audio signals occurring when a call is not in progress include tones corresponding to the depression of said control keys.

13. A method for sharing an output transducer between a program audio source and a telephone, said program audio source providing program audio signals and a first control signal when said program audio source is in use and said telephone providing phone audio signals and a second control signal when said telephone is in use and providing a third control signal when a call is in progress, said method comprising the steps of:
   providing only said program audio signals to said output transducer when only said first control signal is present;
   providing only said phone audio signals to said output transducer when only said second control signal is present;
   providing both said program audio signals and said phone audio signals to said output transducer when said first and second control signals are present and said third control signal is absent; and
   providing only said phone audio signals to said output transducer when said third control signal is present.

14. A method for selecting signals for transducing into audible sound in an entertainment and communications system including a program audio source producing program audio signals and a telephone for conducting a call and producing phone audio signals including dialing tones and ringing tones, said method comprising the steps of:

selecting only said program audio signals when only said program audio source is in use;
selecting only said phone audio signals when only said telephone is in use;
selecting said program audio signals, said dialing tones, and said ringing tones for simultaneous transducing into audible sound when both said program audio source and said telephone are in use but a call is not in progress; and
deselecting said program audio signals when a call is in progress.

* * * * *